United States Patent
Harre et al.

(10) Patent No.: US 8,362,099 B2
(45) Date of Patent: Jan. 29, 2013

(54) METHOD FOR PRODUCING POLYRETHANE SOFT FOAM MATERIALS

(75) Inventors: Kathrin Harre, Dresden (DE); Inge Rotermund, Ortrand (DE); Raimund Ruppel, Dresden (DE); Berend Eling, Lemfoerde (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 962 days.

(21) Appl. No.: 11/574,898

(22) PCT Filed: Sep. 20, 2005

(86) PCT No.: PCT/EP2005/010124
§ 371 (c)(1),
(2), (4) Date: Mar. 8, 2007

(87) PCT Pub. No.: WO2006/034800
PCT Pub. Date: Apr. 6, 2006

(65) Prior Publication Data
US 2007/0219282 A1 Sep. 20, 2007

(30) Foreign Application Priority Data
Sep. 28, 2004 (DE) .......................... 10 2004 047 524

(51) Int. Cl.
*C08G 18/28* (2006.01)
(52) U.S. Cl. .................... 521/174; 252/182.27; 521/137
(58) Field of Classification Search .................. 521/137, 521/174; 252/182.27
See application file for complete search history.

(56) References Cited

U.S. PATENT DOCUMENTS

| 5,235,114 A | 8/1993 | Reisch et al. | |
|---|---|---|---|
| 5,648,559 A * | 7/1997 | Hager | 568/620 |

FOREIGN PATENT DOCUMENTS

| DE | 195 45 695 | 6/1996 |
|---|---|---|
| EP | 1 403 301 | 3/2004 |
| WO | 00 78837 | 12/2000 |
| WO | 2004 105944 | 12/2004 |
| WO | 2004 111107 | 12/2004 |

* cited by examiner

*Primary Examiner* — John Cooney
(74) *Attorney, Agent, or Firm* — Oblon, Spivak, McClelland, Maier & Neustadt, L.L.P.

(57) ABSTRACT

Process for producing flexible polyurethane foams in particular molded flexible polyurethane foams, by reacting
a) polyisocyanates with
b) compounds having at least two hydrogen atoms which are reactive toward isocyanate groups, wherein the component b) comprises
b1a) at least one polyether alcohol having an end block of ethylene oxide units which has been added on by means of DMC catalysis and makes up not more than 10% by weight of the weight of the alkylene oxide added on by means of DMC catalysis, and/or
b1b) at least one polyether alcohol comprising a terminal mixture of ethylene oxide and propylene oxide which has been added on by means of DMC catalysis and has an ethylene oxide content in the mixture of at least 25% by weight, and also
b2a) at least one polyether alcohol or comprising exclusively propylene oxide units, and/or
b2b) at least one graft polyether alcohol.

15 Claims, No Drawings

METHOD FOR PRODUCING POLYRETHANE SOFT FOAM MATERIALS

The invention relates to a process for producing flexible polyurethane foams, in particular molded flexible polyurethane foams, by reacting polyether alcohols which have been prepared by addition of alkylene oxides onto H-functional starter substances using DMC catalysts with polyisocyanates.

Flexible polyurethane foams have been known for a long time. They are usually produced by reacting polyisocanates with or pounds having at least two hydrogen atoms which are reactive toward isocyanate groups. As compounds having at least two hydrogen atoms which are reactive toward isocyanate groups usually made of polyether alcohols and/or polyester alcohols. Polyether alcohols which have an end block of ethylene oxide units, usually in a amount of from to 5 to 25% by weight, based on the weight of the polyether alcohol, and have 70-90% primary hydroxyl groups are usually used for such applications in order to ensure sufficient reactivity of the polyol. Typical hydroxyl numbers of such polyols are in the range from 25 to 35 mg KOH/g. The polyether alcohols mentioned are usually prepared by addition of alkylene oxides onto H-functional starter substances, in particular 2- and/or 3-functional alcohols.

Recently, multimetal cyanide compounds also referred to as DMC catalysts, have frequently been used as catalysts for the addition of alkylene oxides onto H-functional starter substances. The use of DMC catalysts makes it possible to obtain polyether alcohols which have a reduced content of unsaturated constituents. A further advantage of the use of DMC catalysts is the higher space-time yield compared to the use of basic catalysts. However, they also have disadvantages. A significant disadvantage is the formation of very high molecular weight constituents in the polyol which have very adverse effects during foaming. A further disadvantage is that only propylene oxide and mixtures of propylene oxide and ethylene oxide can be added on uniformly. The addition reaction of pure ethylene oxide forms products having a very broad molecular weight distribution. Such polyols are usually turbid have an elevated viscosity, processing difficulties occur in production of the foams and the resulting foams have an increased susceptibility to hydrolysis. For these reasons, polyether alcohols prepared by means of DMC catalysts have hitherto not become established in the production of molded foams.

One possible way of overcoming the problems in the addition reaction of pure ethylene oxide catalyzed by means of DMC catalysts is described in DE 195 45 895 in Example E and in EP 1 403 301. There, propylene oxide, if appropriate in admixture with ethylene oxide, is firstly added on by means of DMC catalysis, a basic catalyst is then added and ethylene oxide is added on. This process can be used to prepare polyether alcohols which have end blocks of ethylene oxide and can be processed further to produce slabstock flexible foams and molded flexible foams, in particular molded flexible foams. However, a disadvantage is, in particular, that the basic catalyst has to be removed, which complicates the process, while the DMC catalyst can remain in the product.

It was an object of the present invention to provide a process for producing flexible polyurethane foams in which polyether alcohols which have been prepared by means of DMC catalysts and have a terminal end block added on by means of DMC catalysis can be used.

This object was surprisingly able to be achieved by using polyether alcohols which have an end block of ethylene oxide units which has been added on by means of DMC catalysis and makes up not more than 10% by weight of the weight of the alkylene oxide added on by means of DMC catalysis or a mixture of ethylene oxide and propylene oxide having an ethylene oxide content in the mixture of at least 25% by weight, based on the mixture, in admixture with at least one polyether alcohol which comprises exclusively propylene oxide units, and/or at least one graft polyether alcohol.

The invention accordingly provides a process for producing flexible polyurethane foams, in particular molded flexible polyurethane foams, by reacting a) polyisocyanates with
b) compounds having at least two hydrogen atoms which are reactive toward isocyanate groups, wherein the component b) comprises
  b1a) at least one polyether alcohol having an end block of ethylene oxide units which has been added on by means of DMC catalysis and makes up not more than 10% by weight of the weight of the alkylene oxide added on by means of DMC catalysis, and/or
  b1b) at least one polyether alcohol comprising a terminal mixture of ethylene oxide and propylene oxide which has been added on by means of DMC catalysis and has an ethylene oxide content in the mixture of at least 25% by weight, and also
  b2a) at least one polyether alcohol comprising exclusively propylene oxide units, and/or
  b2b) at least one graft polyether alcohol The invention further provides the polyether alcohols b1a) and b1b), The component b) thus comprises at least one constituent b1) and at least one constituent b2).

The polyether alcohols b1a) and b1b) preferably have a functionality of from 2 to 4, in particular from 2 to 3, and a hydroxyl number in the range from 20 to 70 mg KOH/g, preferably from 20 to 60 mg KOH/g. Their content of prima hydroxyl groups is preferably at least 25% of all hydroxyl groups, in particular from 25 to 65% of al hydroxyl groups. The polyether alcohols b1a) and b1b) preferably have an ethylene oxide content in the range from 5 to 25% by weight, particularly preferably from 8 to 25% by weight and in particular from 10 to 20% by weight, based on the alkylene oxide added on by means of DMC catalysis.

The preparation of the polyether alcohols b1a) and b1b) is, as described, carried out by addition of alkylene oxides onto H-functional starter substances using DMC catalysts.

As DMC catalysts, it is possible to use the generally known D catalysts. Preference is given to using zinc hexacyanocobaltate.

Alkylene oxides used are ethylene oxide and propylene oxide. Starter substances used are bifunctional and trifunctional alcohols. Examples are glycerol, trimethylolpropane, ethylene glycol, propylene glycol, diethylene glycol, dipropylene glycol and butanediol. In place of the alcohols mentioned, it is also possible to use their reaction products with alkylene oxides. These reaction products preferably have a molecular weight in the range from 400 to 1000 g/mol. Preference is given to adding propylene oxide or a mixture of propylene oxide and ethylene oxide onto the starter substance. This can be repeated as often as desired. In the case of component b1a), pure ethylene oxide is added on at the end of the chain. The amount of ethylene oxide at the end of the chain is not more than 10% by weight, based on the total amount of alkylene oxide added on by means of DMC catalysis. At a higher content, the polyether alcohol can become very turbid and such products can no longer be processed to produce usable foams. A pure propylene oxide block, but preferably a mixture of ethylene oxide and propylene oxide, can be added on before the ethylene oxide end block.

In a preferred embodiment of the polyether alcohols b1a) and b1b), a block of propylene oxide which preferably comprises amount of from 50 to 80% by weight of the total amount of alkylene oxide added on by means of DMC catalysis is firstly added onto the starter substance, and a mixture of ethylene oxide and propylene oxide is added onto this. The mixture of ethylene oxide and propylene oxide is preferably added on by the dynamic method. Here, the ration of ethylene oxide to propylene oxide in the mixture is altered from 1:5 to 5:1 using the preparation of polyether alcohols b1a). This block is joined by the pure ethylene oxide end block in the polyether alcohols b1a).

In the case of the components b1b), a mixture of ethylene oxide and propylene oxide having an ethylene oxide content in the mixture of at least 25% by weight is added on at the end of the chain. The end block preferably contains from 10 to 35% by weight of the total alkylene oxides added on by means of DMC catalysts.

In a particular embodiment, the ratio of ethylene oxide to propylene oxide is altered during the course of the metered addition in the joint molecular addition of the alkylene oxides to form the components b1a) and b1b). This process is described for example, in WO 01/44347 and is also referred to as dynamic metering.

The method of dynamic metering is preferably employed in the preparation of the component b1a) for the addition reaction of a mixture of ethylene and propylene oxide prior to the addition of the ethylene oxide end block. Particular preference is given to reducing the content of propylene oxide in the mixture during the metered addition and increasing the content of ethylene oxide during the course of the metered addition. In a particularly preferred embodiment, the propylene oxide content is reduced to zero during the course of the metered addition, so that finally pure ethylene oxide is added or in the amount required to form the end block.

In the preparation of the component b1b), the method of dynamic metering is preferably employed in the addition of the end block. Particular preference is given to starting with a higher amount of propylene oxide and a smaller amount of ethylene oxide in the mixture in the addition of the end block and reducing the amount of propylene oxide in the mixture and increasing that of ethylene oxide in the mixture during the course of the metered addition, until the mixture has the desired ratio of ethylene oxide to propylene oxide at the end of the metered addition.

As already stated, at least one polyether alcohol b1a), at least one polyether alcohol b1b) or a mixture of polyether alcohols b1a) and b1b) can be present in the component b). The component b) contains at least 5% by weight, preferably at least 10% by weight, of at least one polyol b1a) and/or b1b).

The polyether alcohols b2a) which comprise exclusively propylene oxide units are prepared by addition of propylene oxide onto H-functional starter substances. The addition reaction can be carried out using basic or DMC catalysts, with preference being given to polyether alcohols in which the addition reaction is carried out using DMC catalysts. The hydroxyl number of these polyether alcohols is preferably in the range from 20 to 60 mg KOH/g, and the functionality is from 2 to 4, preferably from 2 to 3. As starter substances, preference is given to using the compounds also used for preparing the components b1a) and b1b). They are, in particular, used in an amount of from 10 to 30% by weight, based on the component b).

The preparation of the polyether alcohols is carried out under the conditions customary for this purpose. At the beginning of the reaction, the starter substance is placed in a reaction vessel and, if necessary, water and other volatile compounds are removed. This is usually achieved by distillation, preferably under reduced pressure. The catalyst can be present initially in the starter substance, but it is also possible to add the catalyst only after the treatment of the starter substance. In the latter variant, the catalyst is subjected to less thermal stress. Before the alkylene oxides are metered in, it is customary to make the reactor inert in order to avoid undesirable reactions of the alkylene oxides with oxygen. This is followed by the metered addition of he alkylene oxides or a mixture of alkylene oxides and the starter substance, with the addition reaction being carried out in the above-described manner. The addition reaction of the alkylene oxides is usually carried out at pressures in the range from 0.01 bar to 10 bar and temperatures in the range from 50 to 200° C., preferably from 90 to 150° C. It has been found that the rate at which the alkylene oxides are metered in likewise has an influence on the reactivity of the polyether alcohols formed. The faster the alkylene oxides are introduced, the higher the reactivity of the resulting polyether alcohols. The addition of the alkylene oxides is usually followed by an after-reaction phase to allow complete reaction of the alkylene oxides. Unreacted monomers and volatile compounds are then removed from the reaction mixture, usually by means of distillation. The catalyst can usually remain in the polyether alcohol, but it is in principle also to remove all or part of it, for example by filtration. The finished polyether alcohol is usually stabilized against thermooxidative degradation, normally by addition of antioxidants such as sterically hindered amines or phenols.

The DMC catalysts used in the preparation of the polyether are known and are described, for example, in EP-A 1 053 787 or EP-A 0 755 716.

Graft polyols are dispersions of polymers in polyether alcohols. Such polyols can be prepared by in-situ polymerization of ethylenically unsaturated monomers, in particular styrene and and/or acylonitrile, in carrier polyols, preferably polyether alcohols. The polymerization is usually carried out in the presence of initiators, polymerization regulators and polyols having built-in ethylenically unsaturated bonds, frequently also referred to as macromers. Such polyols have been known for a long time and are described, for example, in WO 03/78496. The graft polyols preferred for the purposes of the process of the invention have a hydroxyl number in the range from 10 to 50 mg KOH/g, a functionality of from 2 to 3 and a solids content of from 35 to 50% by weight.

They are preferably used in an amount of from 5 to 25% by weight, particularly preferably from 8 to 15% by weight. If the amounts are smaller, the effects are too weak, while larger amounts result in an excessive in the viscosity of the component b).

To produce the flexible polyurethane foams, the polyether alcohols described are reacted with polyisocyanates. As regards the starting materials used for this purpose, the following details ray be provided.

Polyisocyanates a) used here are all isocyanates having two or ore isocyanate groups in the molecule. Both aliphatic isocyanates, e.g. hexamethylene diisocyanate (HDI) or isophorone diisocyanate (IPDI), or preferably aromatic isocyanates, e.g. tolylene diisocyanate (TDI), diphenylmethane diisocyanate (MDI) or mixtures of diphenylmethane diisocyanate and polymethylenepolyphenylene polyisocyanates (crude MDI) can be used. It is also possible to use isocyanates which have been modified by incorporation of urethane, uretdione, isocyanurate, allophanate, uretonimine and other groups, known as modified isocyanates.

TDI is particularly preferably used for producing slabstock flexible foams, while preference is given to using MDI and its higher homologues in the preferred production of molded foams.

As compounds having at least two groups which are reactive toward isocyanate groups, which are used in admixture with the polyether alcohols b1), preference is given to using polyols. Among polyols, polyether polyols and polyester polyols have the greatest industrial importance. The polyether polyols used for preparing polyurethanes are usually prepared by base-catalyzed addition of alkylene oxides, in particular ethylene oxide and/or propylene oxide, onto H-functional starter substances. Polyester polyols are usually prepared by esterification of polyfunctional carboxylic acids with polyfunctional alcohols. The polyols used preferably have a hydroxyl number in the range from 20 to 100 mg KOH/g and a functionality in the range from 2 to 4.

In a preferred embodiment of the process of the invention, at least one polyether alcohol which has been prepared by means of DMC catalysis and has a hydroxyl number in the range from 20 to 40 mg KOH/g, an ethylene oxide content in the range from 5 to 20% by weight, based on the total weight of the polyether alcohol, and an end block of ethylene oxide and propylene oxide having an ethylene oxide content of from 25 to 75% by weight, based on the amount of alkylene oxide in the end block. is used in admixture with the polyether alcohols used according to the invention.

The compounds having at least to groups which are reactive toward isocyanate groups also include the chain extenders and/or crosslinkers which can be concomitantly used if appropriate. These are at least bifunctional amines and/or alcohols having molecular weights in the range from 60 to 400.

As blowing agent, use is usually made of water, compounds which are gaseous at the reaction temperature of the urethane reaction and are inert toward the starting materials for the polyurethanes known as physically acting blowing agents, or mixtures thereof. Physically acting blowing agents used are usually hydrocarbons having from 2 to 6 carbon atoms, halogenated hydrocarbons having from 2 to 6 carbon atoms, ketones, acetals ethers inert gases such as carbon dioxide or noble gases.

As catalysts, preference is given to using amine compounds and/or metal compounds, in particular heavy metal salts and/or organometallic compounds. In particular, known tertiary amines and/or organic metal compounds are used as catalysts. Possible organic metal compounds are, for example, tin compounds, for example tin(II) salts of organic carboxylic acids, e.g. tin(II) acetate, tin(II) octoate, tin(II) ethylhexanoate and tin(II) laurate, and dialkyltin(IV) salts of organic carboxylic acids e.g. dibutyltin diacetate, dibutyltin dilaurate, dibutyltin maleate and dioctyltin diacetate. Examples of organic amines customary for this purpose are: triethylamine, 1,4-diazabicyclo[2.2.2]octane, tributylamine, dimethylbenzylamine, N,N,N',N'-tetramethyaethylenediamine. N,N,N'N'-tetramethylbutanediamine, N,N,N',N'-tetramethylhexane-1,6-diamine, dimethylcyclohexylamine. The catalysts described can be used individually or in the form of mixtures.

Preference is given to using organic metal compounds as catalysts in the process of the invention, since these have the best compatibility with the multimetal cyanide compounds.

Auxiliaries and/or additives used are, for example, mold release agents flame retardants, colorants, fillers and/or reinforcing materials.

It is customary in industry to mix all starting materials with the exception of the polyisocyanates to form a polyol component and to react this with the polyisocyanates to produce the polyurethane.

The polyurethanes can be produced by the one-shot process or by the prepolymer process.

An overview of the stating materials for the production of polyurethanes and the processes employed for this purpose may be found for example, in the Kunststoffhandbuch, volume 7 "Polyurethane", Carl-Hanser-Verlag Munich, Vienna, 1st edition 1966, 9nd edition 1983 and 3rd edition 1993.

The foams produced by the process of the invention display very good processing properties and good mechanical properties. The polyether alcohols used for producing them can be prepared in advantageous manner and have good compatibility with the other constituents of the polyol component.

The invention is illustrated by the following examples.

TABLE 1

Polyether alcohols used

| | Polyether | | | | | |
|---|---|---|---|---|---|---|
| | A | B | C | D | E | F |
| Amount of catalyst [ppm] | 100 | 100 | 100 | 125 | 100 | 100 |
| Starter substance* | VP900 | VP900 | VP900 | VP900 | VP900 | VP900 |
| Starter substance [kg] | 1.83 | 1.83 | 2.93 | 2.1 | 1.65 | 1.65 |
| PO [kg] | 3.93 | 3.45 | 3.07 | 17.9 | 4.11 | 5.03 |
| PO/EO mixture, dynamic [kg] | 2.24 | 2.24 | 1.6 | — | 2.24 | 1.22 |
| of which EO [kg] | 1.12 | 1.12 | 0.8 | — | 1.12 | 1.12 |
| Metering rate of PO at beginning [kg/h] | 1.0 | 1.0 | 1.0 | — | 1.0 | 0.6 |
| Metering rate of PO at end [kg/h] | 0.2 | 0.2 | 0.2 | — | 0.2 | 0.1 |
| Metering rate of EO at beginning [kg/h] | 0.2 | 0.2 | 0.2 | — | 0.2 | 0.6 |
| Metering rate of EO at end [kg/h] | 1.0 | 1.0 | 1.0 | — | 1.0 | 3.4 |
| End block of EO [kg] | 0 | 0.48 | 0.4 | — | 0 | 0 |
| Metering rate [kg/h] | 0 | 1 | 1 | — | 0 | 0 |
| Properties | | | | | | |
| 1° OH [%]** | 34 | 55 | 46 | 0 | 39 | 32 |
| OHN [mg KOH/g] | 34.1 | 35.0 | 54.5 | 42 | 32.3 | 28.2 |
| Viscosity at 25° C. [mPas] | 895 | 890 | 542 | 797 | 919 | 1150 |
| $M_w$ [g/mol] | 3938 | 2993 | 2708 | 3420 | 3885 | 3989 |

EO—Ethylene oxide
PO—Propylene oxide
*Prepolymer prepared by propoxylation of a mixture of glycerol and monoethylene glycol in a molar ratio of glycerol to monoethylene glycol of 3:1 and having a hydroxyl number of 168 mg KOH/g
**Content of primary hydroxyl groups from ethylene oxide, based on the total content of hydroxyl groups Preparation of the Polyether Alcohols—General Method The synthesis was carried out in a cleaned and dried 10 l stirring autoclave. The amounts of prepolymer indicated in Table 1 were placed in the stirred vessel and admixed with the indicated amount of a multimetal cyanide compound prepared from zinc acetate and hexacyanocobaltic acid in the presence of a surface-active agent. The contents of the vessel were made inert by means of nitrogen and treated at 120° C. under reduced pressure for a total period of 1 hour. At 120° C., the indicated amounts of alkylene oxides were metered in at the metering rates indicated in the table. After the metered addition was complete, the reaction mixture was stirred until the pressure was constant and was then degassed at 105° C. and 10 mbar.

The properties of the resulting polyether alcohols are likewise shown in table.

The properties were determined by the following methods:

The content of primary hydroxyl groups from ethylene oxide and propylene oxide was determined by reaction of the hydroxyl groups of the polyether alcohol with trichloroacetyl isocyanate and subsequent measurement using a BRUKER DPX 250 NMR spectrometer with z-shielded inverse sample head 5 mm. In the spectrum, the primary hydroxyl groups derived from ethylene oxide, the primary hydroxyl groups derived from propylene oxide and the secondary hydroxyl groups display different peaks. The viscosity, reported in mPas, was determined at 25° C. in accordance with DIN 51562.

Production of the Foams

EXAMPLE 1

A polyol component was prepared by stirring together 75.50 pars by weight of polyol A, 10 parts by weight of polyol B, 10 parts by weight of a graft polyol having a hydroxyl number of 20 mgKOH/g and a solids content of 43.5% by weight and prepared by in-situ polymerization of equal weights of styrene and acrylonitrile (Lupranol® L 4800 from BASF AG), 0.20 part by weight of catalyst N 206 from BASF AG, 0.40 part by weight of catalyst N 201 from BASF AG, 0.15 part by weight of catalyst TMHDA from Huntsman, 0.10 part by weight of foam stabilizer Tegostab® B 8680 from Goldschmidt AG and 3.65 parts by weight of water. This was mixed at an index of 100 with a prepolymer based on monomeric and polymeric diphenylmethane diisocyanate and bifunctional and trifunctional poly(oxyalkylene)polyols and having an NO content of 27% by weight and transferred to a mold having a capacity of 14.5 which had been provided with mold release agent and had been preheated to 40° C. After 10 minutes, the flexible foam molding could be removed from the mold without problems. Mechanical testing at a foam density of 42 kg/m$^3$ (DIN 53420) gave a compressive strength of 5.4 kPa (DIN 53577), a tensile strength of 135 kPa (DIN 53571) and an elongation of 105% (DIN 53571).

EXAMPLE 2

A polyol component was prepared by stirring together 55.00 parts by weight of polyol B, 18 parts by weight of polyol D, 21 parts by weight of polyol F, 0.15 part by weight of catalyst N 206 from BASF AG, 0.20 par by weight of catalyst N 201 from BASF AG, 2.50 parts by weight of foam stabilizer Tegostab® B 8680 from Goldschmidt AG and 3.15 parts by weight of water. This was mixed at an index of 95 with a prepolymer based on monomeric and polymeric diphenylmethane diisocyanate and a trifunctional poly(oxyalkylene) polyol and having an NCO content of 28% by weight and transferred to the mold which had been provided with mold release agent and had beer preheated to 45° C. The viscoelastic foam formed had a latex-like feel.

The invention claimed is:

1. A process for producing flexible polyurethane foams, comprising:
   providing b1a) at least one polyether alcohol having an end block of exclusively ethylene oxide units wherein said end block has been added on by means of DMC catalysis only and the end block makes up not more than 10% by weight of the weight of the alkylene oxide added on by means of DMC catalysis,
   providing at least one component selected from the group consisting of b2a) at least one polyether alcohol comprising exclusively propylene oxide units, and b2b) at least one graft polyether alcohol, and
   reacting b1a) and at least one of b2a) and b2b) with one or more polyisocyanates.

2. The process according to claim 1, wherein the polyether alcohols b1a) and b1b) have a functionality of from 2 to 4.

3. The process according to claim 1, wherein the polyether alcohols b1a) and b1b) have a functionality of from 2 to 3.

4. The process according to claim 1, wherein the polyether alcohols b1a) and b1b) have a hydroxyl number in the range from 20 to 70 mg KOH/g.

5. The process according to claim 1, wherein the polyether alcohols b1a) and b1b) have a hydroxyl number in the range from 20 to 60 mg KOH/g.

6. The process according to claim 1, wherein the polyether alcohols b1a) and b1b) have an ethylene oxide content in the range from 5 to 25% by weight, based on the alkylene oxide added on by means of DMC catalysis.

7. The process according to claim 1, wherein the polyether alcohols b1a) and b1b) have an ethylene oxide content in the range from 8 to 25% by weight, based on the alkylene oxide added on by means of DMC catalysis.

8. The process according to claim 1, wherein the polyether alcohols b1a) and b1b) have an ethylene oxide content in the range from 10 to 20% by weight, based on the alkylene oxide added on by means of DMC catalysis.

9. The process according to claim 1, wherein the polyether alcohols b1a) have an amount of ethylene oxide at the end of the chain of not more than 10% by weight, based on the total amount of alkylene oxide added on by means of DMC catalysis.

10. The process according to claim 1, wherein the component b) comprises at least 5% by weight of at least one polyol b1a) and/or b1b).

11. The process according to claim 1, wherein the component b) comprises at least 10% by weight of at least one polyol b1a) and/or b1b).

12. The process according to claim 1, wherein the component b) comprises from 10 to 25% by weight, based on the component b), of the polyether alcohol b2a).

13. The process according to claim 1, wherein the component b) comprises graft polyols b2b) in an amount of from 5 to 25% by weight, based on the component b).

14. The process according to claim 1, wherein the component b) comprises graft polyols b2b) in an amount of from 8 to 15% by weight, based on the component b).

15. The process according to claim 1, wherein the component b) further comprises
   b1b) at least one polyether alcohol comprising a terminal mixture of ethylene oxide and propylene oxide which has been added on by means of DMC catalysis and has an ethylene oxide content in the mixture of at least 25% by weight.

* * * * *